Oct. 10, 1967 N. T. PROUD 3,345,794
CONSTRUCTION AND ERECTION OF FRAMING MEMBERS
Filed April 26, 1965 5 Sheets-Sheet 1

INVENTOR
NORMAN T. PROUD
BY Emery L. Groff
ATTY

Oct. 10, 1967     N. T. PROUD     3,345,794
CONSTRUCTION AND ERECTION OF FRAMING MEMBERS
Filed April 26, 1965     5 Sheets-Sheet 3

INVENTOR
NORMAN T. PROUD
By Emory L. Groff Jr.
Atty

Oct. 10, 1967   N. T. PROUD   3,345,794
CONSTRUCTION AND ERECTION OF FRAMING MEMBERS
Filed April 26, 1965   5 Sheets-Sheet 4
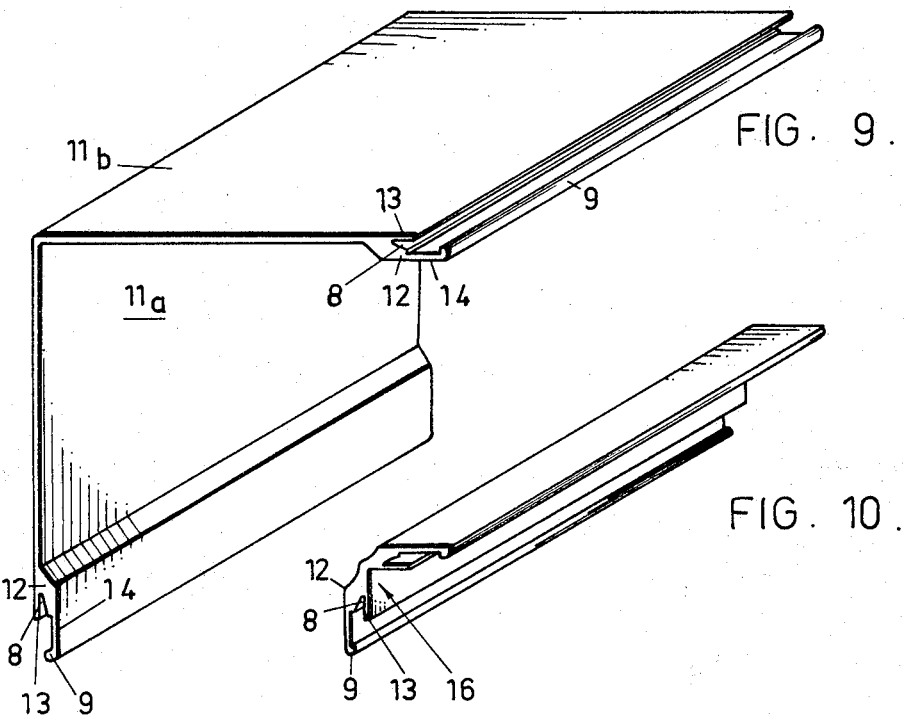
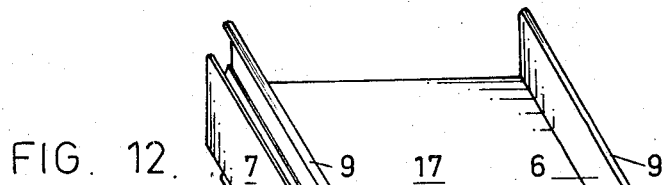
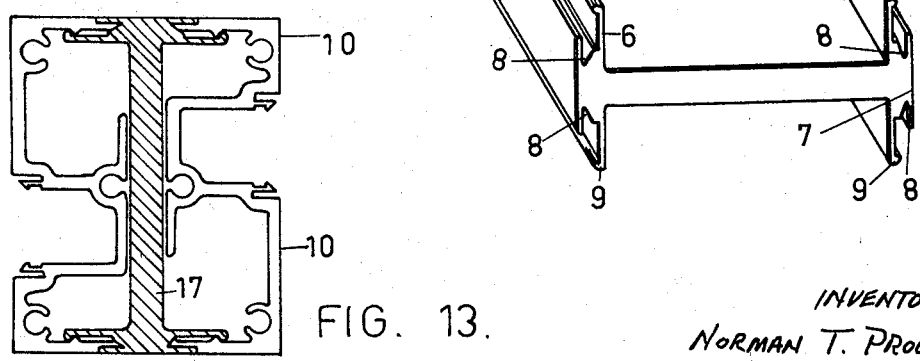
INVENTOR
NORMAN T. PROUD

United States Patent Office 3,345,794
Patented Oct. 10, 1967

3,345,794
CONSTRUCTION AND ERECTION OF
FRAMING MEMBERS
Norman Thomas Proud, Newtown, New South Wales, Australia, assignor to Paul Segaert Pty. Limited, Newtown, New South Wales, Australia, a company of New South Wales
Filed Apr. 26, 1965, Ser. No. 450,624
Claims priority, application Australia, Apr. 29, 1964, 43,873/64
7 Claims. (Cl. 52—731)

ABSTRACT OF THE DISCLOSURE

A construction of framing members for the manufacture of window frames, door frames, partitions and the like in buildings wherein a small number of extruded primary sections and secondary sections are so formed that selections can be made therefrom to fabricate a large number of designs of frame members having the surfaces on one side of selected conjoined primary and secondary members flush with each other.

---

This invention relates to extruded sections adapted for the manufacture of window frames, door frames, partition frames and the like.

Hitherto, extruded sections were designed and made to be fabricated for any one of the frames referred to, which made it necessary for the fabricator to carry stocks of a large number of extruded sections of varying designs to meet the requirements for particular building purposes.

The object of the present invention is to eliminate this necessity and to provide a small number of extruded primary and secondary sections from which selections can be made to fabricate a large number of designs of frame members having the surfaces on one side of conjoined primary and secondary sections flush with each other. For example, I have at present devised 14 primary sections, and 6 secondary sections which can be made up into 250 different frame members and in addition, the primary sections can be used as individual frame members where so required if desired.

The term "primary section" as used herein means an extruded section which will form a component of a frame such as a stile, sill, head, top plate or bottom plate which in turn is to form a selected window, door or partition frame and which incorporates means whereby one primary section can be connected, with the aid of a secondary section, to another primary section, to form frame members such as transoms, mullions, central mullions, droppers and corner posts. The term "secondary section" used herein means an extruded section which will connect and interlock pairs of primary sections.

According to this invention, the primary sections each have at least two wall parts in parallel spaced relationship. The wall parts each have a tongue thereon and the pair of tongues are longitudinally aligned in parallel spaced relationship. They are formed by making a step in the outer surface of each wall part. Additionally the wall parts each have a bead projecting from its inner surface in parallel relationship to and in spaced relationship from the tongue. Each secondary section has oppositely disposed grooves and beads adapted to interlock with the tongues and beads of aligned wall parts of two primary sections, and has a wall part providing a flush surface with conjoined primary sections.

Several constructions of primary and secondary sections, which can be erected in various combinations to achieve the object of the invention, are described by way of examples with reference to the annexed drawings.

These drawings show extruded sections in perspective and combinations of the extruded sections in end sectional elevation.

FIGURES 9 and 10 show modification of the secondary section illustrated in FIGURE 7.

FIGURE 12 shows a modified form of the secondary section of FIGURE 4 wherein two such secondary sections are joined by a primary and secondary section reinforcing member.

FIGURE 13 shows another assembly of the primary sections of FIGURE 6, connected and reinforced by the secondary sections of FIGURE 12.

Figure 1:
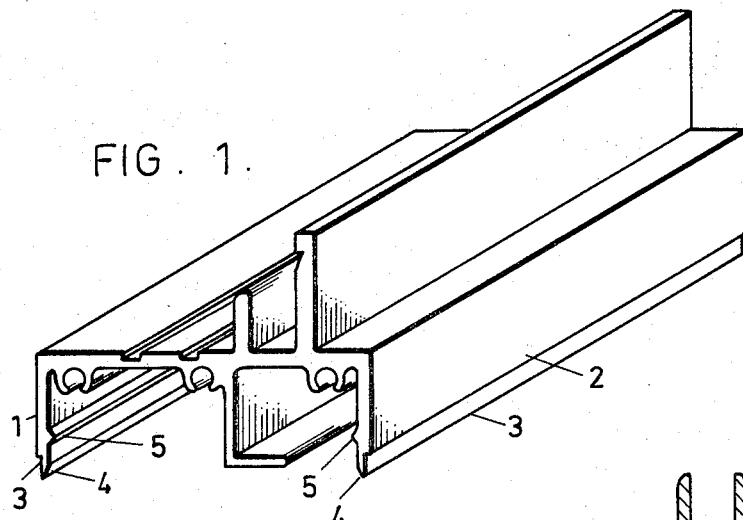
FIGURE 1 is a primary section, single track sill or transom for fixed and sliding window panel combinations
Figure 2:
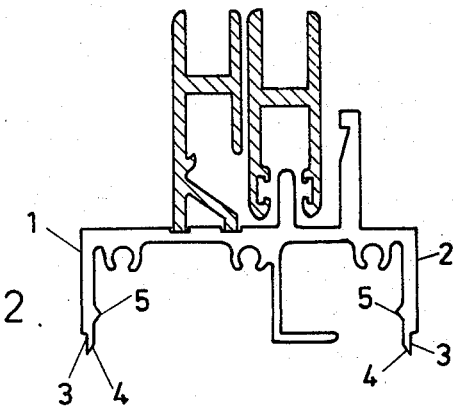
FIGURE 2 shows the manner of mounting fixed and sliding foot rails thereon.
Figure 3:
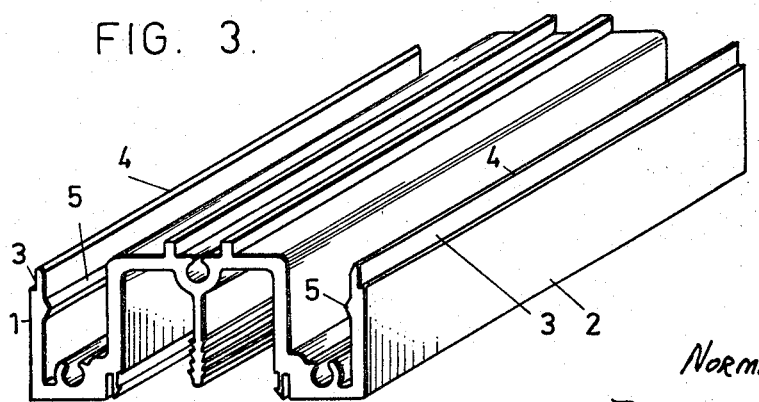
FIGURE 3 is a primary section, double head guide for a sliding window and door panels.

As illustrated in the drawings, the primary sections each include two wall parts 1 and 2 located in parallel spaced relationship. Each wall part has a tongue 3 formed by a step in the outer surface of each wall part 1, 2 and each tongue 3 preferably has a tapered nose 4. Each wall part also has a bead 5 thereon, formed on the inner surface and located parallel to and in spaced relationship from the tongue 3. The other parts of the primary sections are constructed according to the function they are to fulfill, such as frames to constitute transoms, mullions, central mullions, droppers and corner posts, and to accommodate glazing or panelling as desired. The primary sections also include internal arcuate channels C of known form, formed and located therein as desired. These channels C provide the means whereby the primary sections can be fixed together at their ends, at 90° to each other. To do this a junction is made between two primary sections by drilling holes through the wall of the channels C of one primary section in alignment with the channels C in the other primary section, and passing fixing screws through the holes into the channels. This fixing of one primary section to another at a right-angle, is simplified as a result of the invention, by the ability to make the joint before one of the primary sections of one of the units is fixed to its mating section. Moreover, it provides that the fixing screws are completely concealed within the assembled parts.

The secondary sections, having the interlocking means previously referred to formed thereon and which will be fully described later, are otherwise shaped according to the function the composite assembly of primary and secondary sections is to fulfill.

Figure 4:
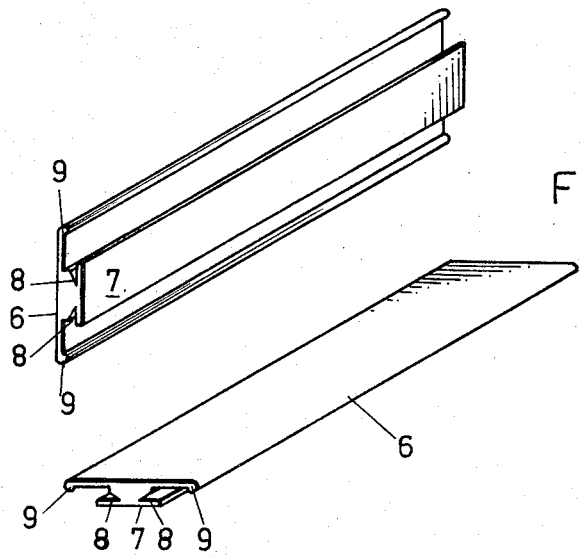
FIGURE 4 is a secondary section for connecting the primary sections of FIGURES 1 and 3.
Figure 5:
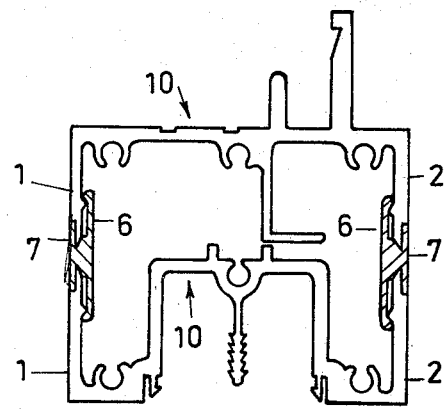
FIGURE 5 shows the primary sections of FIGURES 1 and 3 connected by the secondary section of FIGURE 4, the fixed and sliding foot rails of FIGURE 2 being omitted.
Figure 6:
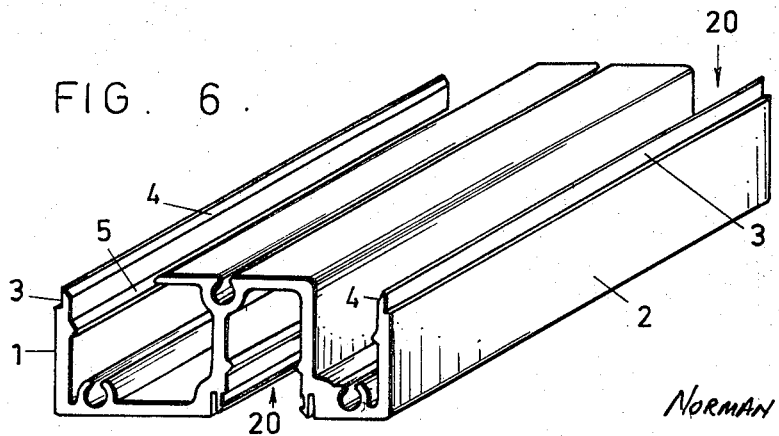
FIGURE 6 is a primary section, single channel stile suitable for use in conjunction with the arrangement of FIGURE 5.

As illustrated in FIGURE 4, the secondary section has wall parts 6 and 7 with oppositely disposed dovetail grooves 8 between them. The wall part 6, which is the inside wall part of a composite assembly, is wider than the wall part 7 and it has a bead 9 on each longitudinal edge. It is adapted to connect two primary sections, such as those indicated at 10 in FIGURE 5, so that the tongues 3 enter the respective dovetail grooves 8 and the beads 9 engage the beads 5 on the edge remote from the tongues 3, thus forming an interlock which maintains two primary sections rigidly in designed relationship.

Figure 7:
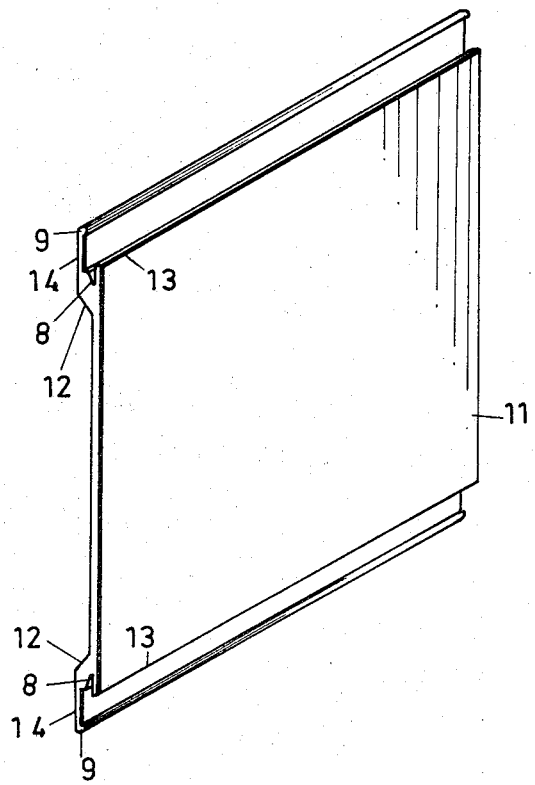
FIGURE 7 is a variation of the secondary section illustrated in FIGURE 4.
Figure 8:
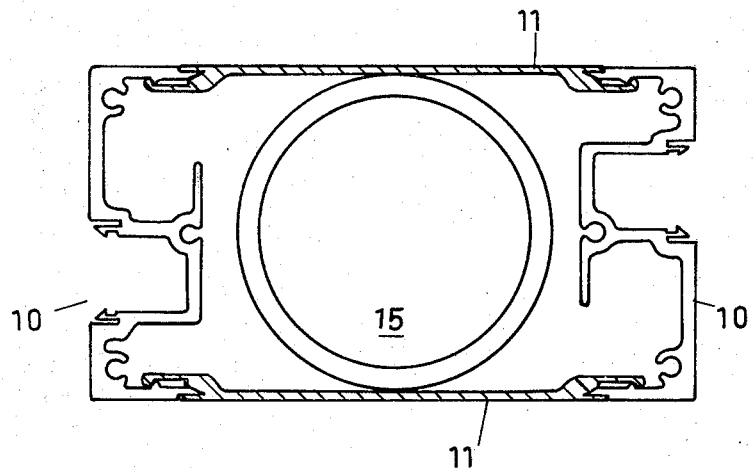
FIGURE 8 shows how two of the primary sections illustrated in FIGURE 6 can, with the aid of secondary sections illustrated in FIGURE 7, be erected around a pipe or column.

As illustrated in FIGURE 7, the secondary section has a plate-like body part 11 with lug-like enlargement 12 formed adjacent each longitudinal edge 13 thereof. The enlargements 12 are shaped to form with the longitudinal edges 13, the dovetail grooves 8. The beads 9 are formed on extensions 14 of the lug-like enlargements. This type of secondary section is used for connecting two primary sections 10 in diametrically opposed relationship on each side of a pipe or column 15 as shown in FIGURE 8.

In the construction illustrated in FIGURE 9, the plate-like body part of the secondary section is an angle plate composed of limbs 11a and 11b. In all other respects it is constructed in the same manner as that illustrated in FIGURE 7 and the same reference numbers are used. As depicted in FIGURE 10 the secondary section is in substance, the secondary section of FIGURE 4, with a right-angle bend formed longitudinally therein as indicated at 16. It will be observed that the beads 9 of the forms of secondary sections, illustrated in FIGURES 9 and 10, face in opposite directions.

These forms of secondary sections, FIGURES 9 and 10, are used for connecting two primary sections 10 at right-angles around the pipe or column 15.

As explained in the description to the drawings, the secondary sections illustrated in FIGURE 12 are of the same formation as the secondary section of FIGURE 4, and they have been duplicated at each side of a reinforcing member 17. This form of secondary section is used to connect and provide a stable reinforcement for two primary sections 10 where rigidity over a substantial distance is required.

Figure 14:
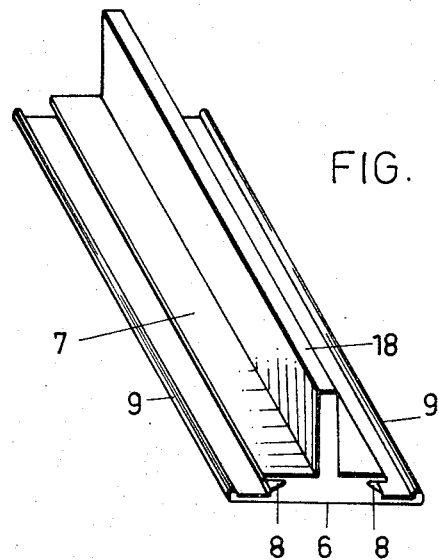
FIGURE 14 is a modification of the secondary section of FIGURE 4, incorporating a glazing bar.
Figure 11:
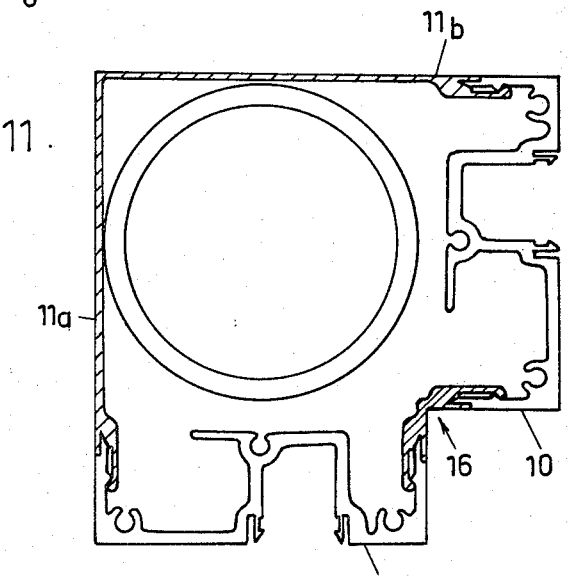
FIGURE 11 shows another assembly of the primary sections of FIGURE 6 around a pipe or column.
Figure 15:
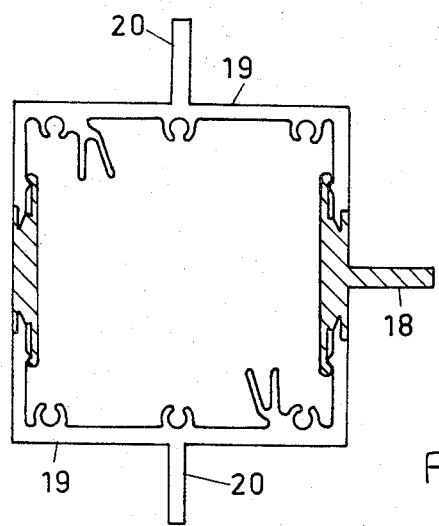
FIGURE 15 shows an assembly of two primary sections which each incorporate a glazing bar, wherein the primary sections are connected by the secondary section of FIGURE 4 and the secondary section of FIGURE 14, to provide three outwardly projecting glazing bars around the assembly.

The secondary section illustrated in FIGURE 14 is of the same basic formation as that described for FIGURE 4, having added to it a glazing bar 18. This form of secondary section is useful where a glazing bar is required at the position of the secondary section, as illustrated in FIGURE 15, which shows two primary sections 19 also equipped with glazing bars 12.

In the extrusion and storage and handling of framing sections and particularly framing sections of substantial length, it is extremely difficult to obtain uniformly straight sections. Consequently, in the fabrication and erection of frame assemblies of such sections hitherto, considerable time could be lost and cost incurred in correctly aligning the individual sections of the assembly. This problem of alignment of the sections is overcome by the present invention, by the snap-over action and interlock of the primary and secondary sections.

It will also be understood that the invention is not restricted to the forms of primary and secondary sections described and illustrated. Apart from the interlocking features of these sections, they may be varied in other constructional features to fulfill specific functions and as stated, 14 primary sections each having designed functional features incorporated therein, and 6 secondary sections such as those illustrated, can be made up into 250 different composite frame members. It will therefore be apparent that while the 250 different composite frame members so formed, plus the 14 original primary sections, will meet virtually all foreseeable glazing and panelling requirements, further additions to the number of sections as desired, will increase the range of the composite frame members without departing from the invention.

I claim:

1. A construction of framing members for the manufacture of window frames, door frames, partitions and the like in buildings comprising extrusions of primary sections and secondary sections, wherein the primary sections each include two wall parts in parallel spaced relationship,
    a tongue on each wall part, said tongues longitudinally aligned in parallel spaced relationship, said tongues being formed by making a step in the outer surface of each wall part,
    a bead on each said wall part projecting from its inner surface in parallel relationship to and in spaced relationship from the tongues,
    each secondary section including pairs of inside and outside wall parts having oppositely disposed grooves between them, the inside wall parts being wider than the outside wall parts and each including a bead formed on the longitudinal edge thereof,
    said grooves having the tongues of the primary section engaged therein and the beads on the secondary sections being engaged with the beads on two primary sections to interlock said primary and secondary sections together, the outside wall parts of the secondary sections providing flush surfaces with the conjoined primary sections.

2. A construction of framing members according to claim 1, wherein the wall parts of the primary sections having the tongues thereon, are located in parallel planes.

3. A construction of framing members according to claim 1, wherein the secondary sections have the oppositely disposed grooves and beads in a common plane.

4. A construction of framing members according to claim 1, wherein the secondary sections have the oppositely disposed grooves and beads angularly disposed with relation to one another.

5. A construction of framing members according to claim 1, wherein the secondary sections are joined as a pair by a medial, primary and secondary section reinforcing member.

6. A construction of framing members according to claim 1, wherein the secondary sections are constructed to support primary members about a column.

7. A construction of framing members according to claim 1, wherein the secondary sections incorporate a glazing bar.

References Cited

UNITED STATES PATENTS

| | | | |
|---|---|---|---|
| 2,202,861 | 6/1940 | Mills | 52—464 X |
| 2,604,195 | 7/1952 | Peremi et al. | 52—464 |
| 2,742,116 | 4/1956 | Fitzgerald | 52—588 |
| 2,866,527 | 12/1958 | Schilling | 52—495 X |
| 2,962,133 | 11/1960 | Kivett et al. | 52—463 X |
| 2,988,183 | 6/1961 | Hallock | 52—573 |
| 3,053,353 | 9/1962 | Miller | 52—732 X |
| 3,057,444 | 10/1962 | Walberg | 52—461 |
| 3,216,538 | 11/1965 | Miller | 52—495 |
| 3,293,812 | 12/1966 | Hammitt | 52—492 X |

DAVID J. WILLIAMOWSKY, *Primary Examiner.*

PHILIP C. KANNAN, *Assistant Examiner.*